US012647190B2

(12) United States Patent
Wang et al.

(10) Patent No.: US 12,647,190 B2
(45) Date of Patent: Jun. 2, 2026

(54) ELECTRICAL DISTURBANCES TESTING METHOD AND SYSTEM

(71) Applicant: Beken Corporation, Shanghai (CN)

(72) Inventors: Yanfeng Wang, Shanghai (CN); Qunshan Xu, Shanghai (CN); Jiazhou Liu, Shanghai (CN)

(73) Assignee: Beken Corporation, Shanghai (CN)

( * ) Notice: Subject to any disclaimer, the term of this patent is extended or adjusted under 35 U.S.C. 154(b) by 335 days.

(21) Appl. No.: 18/240,698

(22) Filed: Aug. 31, 2023

(65) Prior Publication Data

US 2024/0430018 A1      Dec. 26, 2024

(30) Foreign Application Priority Data

Jun. 20, 2023    (CN) .......................... 202310739288.3

(51) Int. Cl.
| | |
|---|---|
| *H04B 17/00* | (2015.01) |
| *H04B 17/10* | (2015.01) |
| *H04B 17/17* | (2015.01) |

(52) U.S. Cl.
CPC ........... *H04B 17/17* (2015.01); *H04B 17/104* (2015.01)

(58) Field of Classification Search
CPC .... H04B 17/0085; H04B 17/16; H04B 17/17; H04B 17/18; H04B 17/204; H04B 17/345; H04B 17/104
See application file for complete search history.

(56) References Cited

U.S. PATENT DOCUMENTS

| | | | | |
|---|---|---|---|---|
| 10,333,634 B1 * | 6/2019 | Abadie | .............. | H04B 17/0085 |
| 2013/0002407 A1 * | 1/2013 | Terrier | .................. | G07B 15/02 |
| | | | | 340/10.42 |
| 2020/0244564 A1 * | 7/2020 | Naseef | .................. | H04W 16/28 |
| 2023/0079684 A1 * | 3/2023 | Hayashi | .............. | H04B 17/318 |
| | | | | 455/226.2 |
| 2023/0283387 A1 * | 9/2023 | Linkola | ................ | H04B 17/318 |
| | | | | 370/329 |

* cited by examiner

*Primary Examiner* — Tuan Pham

(74) *Attorney, Agent, or Firm* — Schwegman Lundberg & Woessner, P.A.

(57)      ABSTRACT

Various embodiments described herein support or provide for electrical disturbance testing, including establishing a communication session between an onboard unit and a roadside unit; generating a radio frequency signal to interfere with the communication session; detecting an interrupt of the communication session at a frequency point associated with the RF signal; determining that the interrupt is caused by a failure of uplink data transmission in the communication session; and adjusting a position of the roadside unit or adjusting a filter communicatively coupled between the roadside unit and the associated antenna to cause the communication session to be reestablished at the frequency point associated with the radio frequency signal.

13 Claims, 6 Drawing Sheets

200

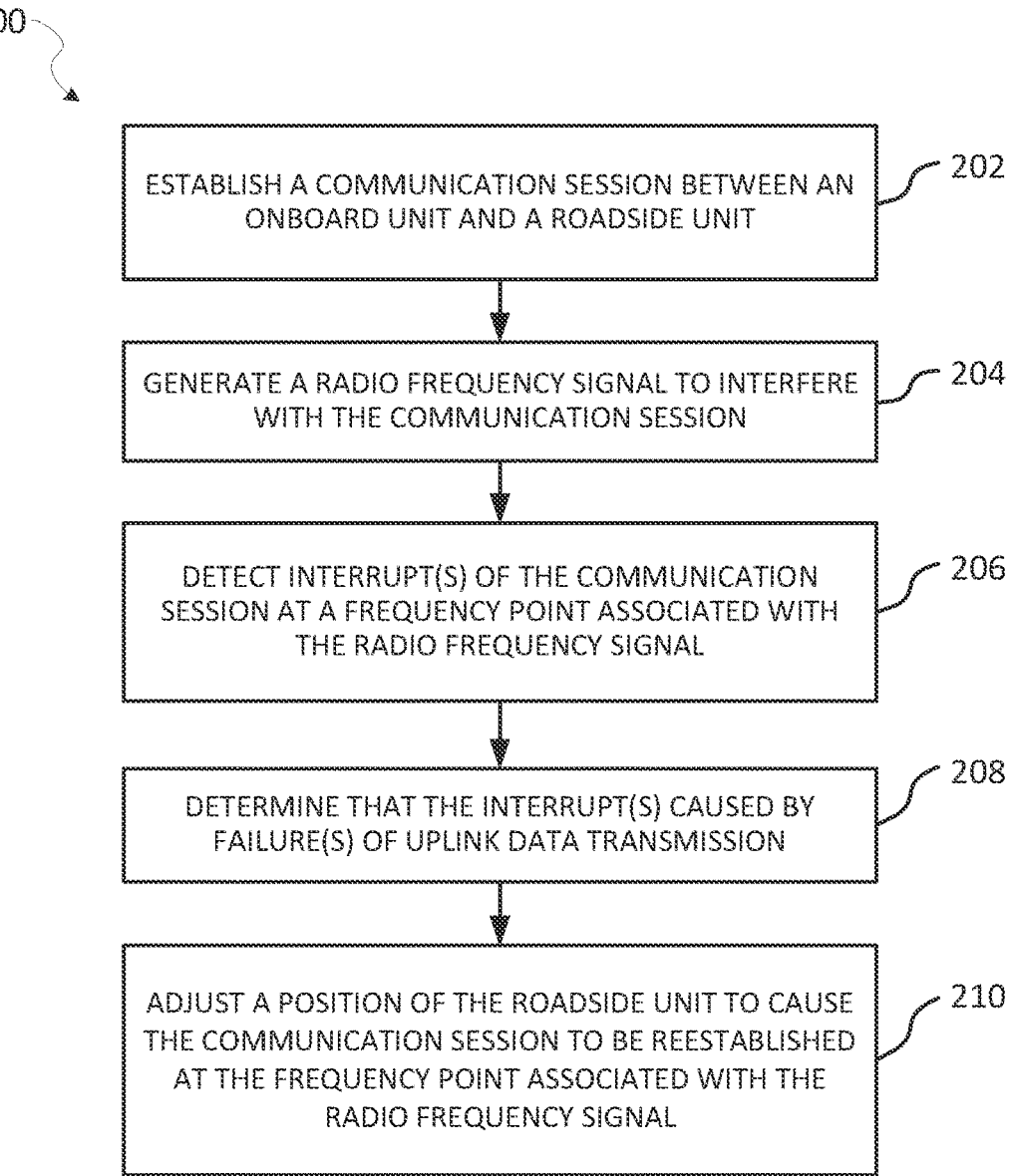

ESTABLISH A COMMUNICATION SESSION BETWEEN AN ONBOARD UNIT AND A ROADSIDE UNIT — 202

GENERATE A RADIO FREQUENCY SIGNAL TO INTERFERE WITH THE COMMUNICATION SESSION — 204

DETECT INTERRUPT(S) OF THE COMMUNICATION SESSION AT A FREQUENCY POINT ASSOCIATED WITH THE RADIO FREQUENCY SIGNAL — 206

DETERMINE THAT THE INTERRUPT(S) CAUSED BY FAILURE(S) OF UPLINK DATA TRANSMISSION — 208

ADJUST A POSITION OF THE ROADSIDE UNIT TO CAUSE THE COMMUNICATION SESSION TO BE REESTABLISHED AT THE FREQUENCY POINT ASSOCIATED WITH THE RADIO FREQUENCY SIGNAL — 210

FIG. 2

300
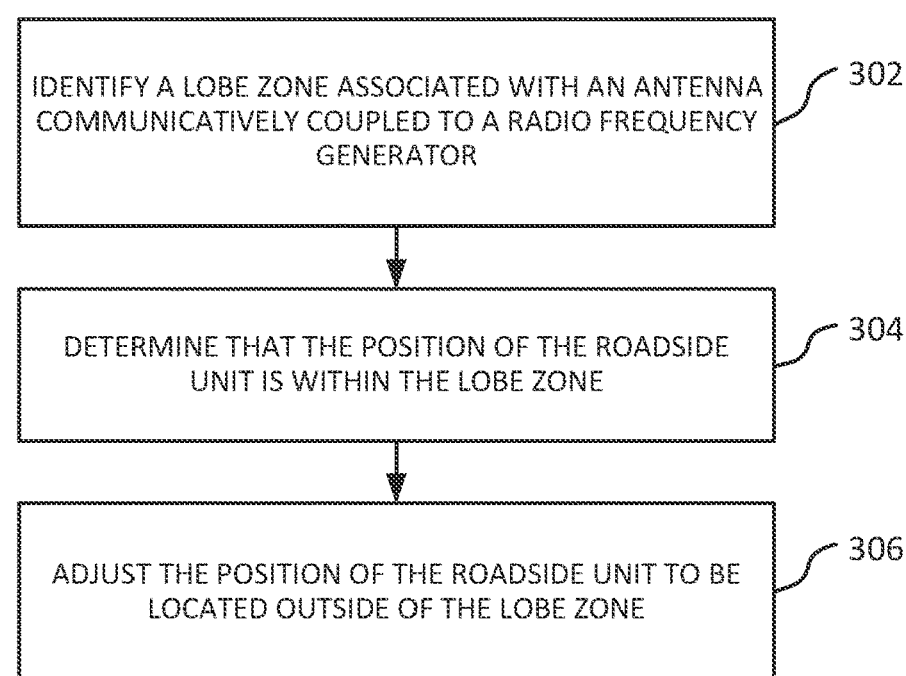
IDENTIFY A LOBE ZONE ASSOCIATED WITH AN ANTENNA COMMUNICATIVELY COUPLED TO A RADIO FREQUENCY GENERATOR — 302
DETERMINE THAT THE POSITION OF THE ROADSIDE UNIT IS WITHIN THE LOBE ZONE — 304
ADJUST THE POSITION OF THE ROADSIDE UNIT TO BE LOCATED OUTSIDE OF THE LOBE ZONE — 306
*FIG. 3*

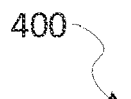

400

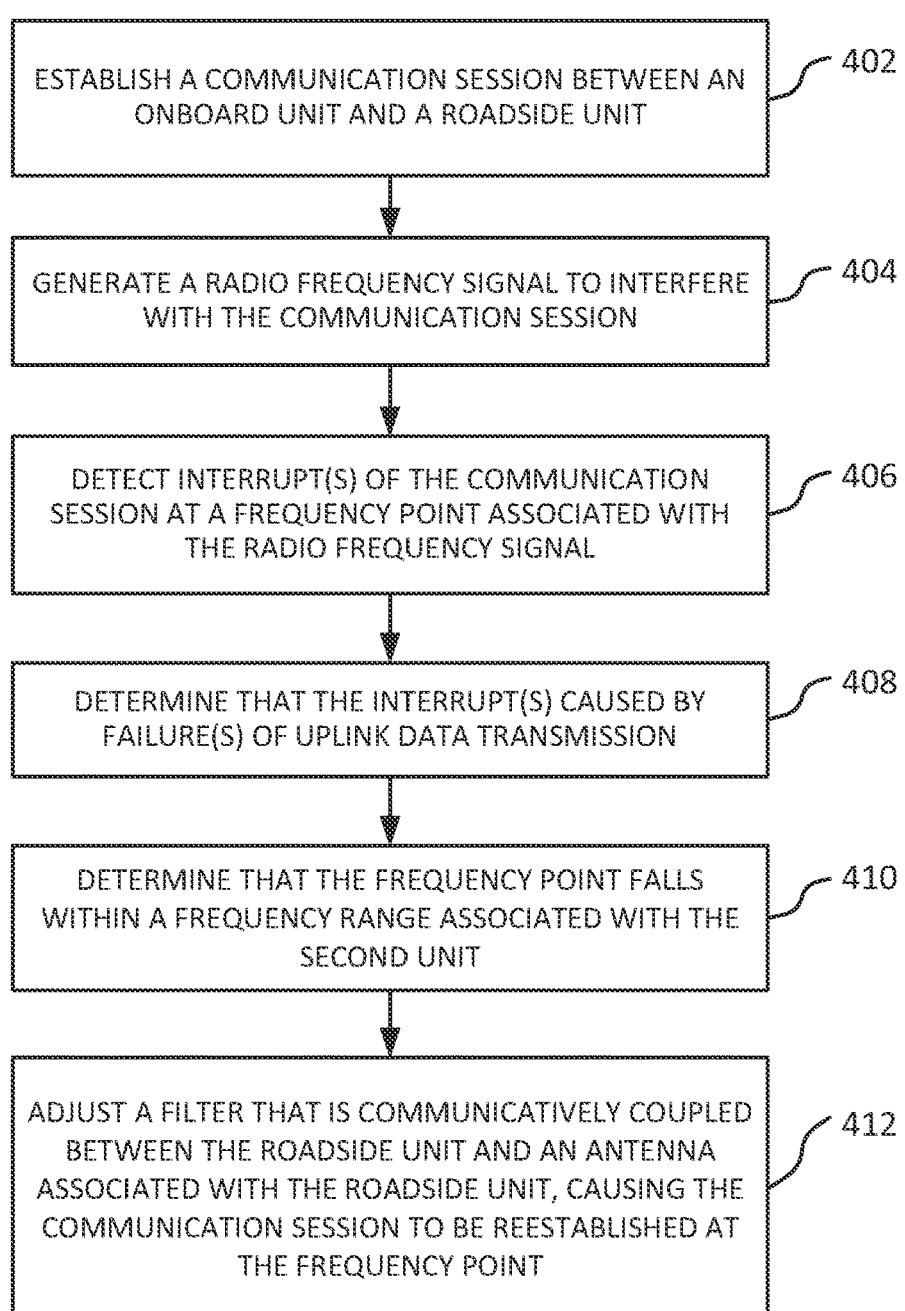

ESTABLISH A COMMUNICATION SESSION BETWEEN AN ONBOARD UNIT AND A ROADSIDE UNIT — 402

GENERATE A RADIO FREQUENCY SIGNAL TO INTERFERE WITH THE COMMUNICATION SESSION — 404

DETECT INTERRUPT(S) OF THE COMMUNICATION SESSION AT A FREQUENCY POINT ASSOCIATED WITH THE RADIO FREQUENCY SIGNAL — 406

DETERMINE THAT THE INTERRUPT(S) CAUSED BY FAILURE(S) OF UPLINK DATA TRANSMISSION — 408

DETERMINE THAT THE FREQUENCY POINT FALLS WITHIN A FREQUENCY RANGE ASSOCIATED WITH THE SECOND UNIT — 410

ADJUST A FILTER THAT IS COMMUNICATIVELY COUPLED BETWEEN THE ROADSIDE UNIT AND AN ANTENNA ASSOCIATED WITH THE ROADSIDE UNIT, CAUSING THE COMMUNICATION SESSION TO BE REESTABLISHED AT THE FREQUENCY POINT — 412

*FIG. 4*

ELECTRICAL DISTURBANCES TESTING METHOD AND SYSTEM

CROSS REFERENCE TO RELATED APPLICATION

This application claims priority to and incorporates by reference Chinese patent application no. 202310739288.3 filed 20 Jun. 2023.

TECHNICAL FIELD

The present disclosure generally relates to systems and methods for electrical disturbance testing and more particularly, but not exclusively, for electrical disturbance testing for onboard units used for electronic toll collection.

BACKGROUND

Electronic toll collection is widely used worldwide. An electronic toll collection system automatically collects usage fees charged to vehicles for their use of certain roads, lanes, or bridges, etc. Electronic toll collection requires communication between an onboard unit and a roadside unit to exchange data, including vehicle identification, location, and travel distance, etc. Onboard units, especially pre-installed onboard units, are required to pass electrical disturbance testing in certain jurisdictions before being provided to vehicle manufacturers. Challenges arise during electrical disturbance testing of such onboard units, especially when it comes to identifying and analyzing communication failures that occurred during the test.

SUMMARY

An embodiment provides a method comprising establishing a communication session between an onboard unit and a roadside unit; generating a radio frequency (RF) signal to interfere with the communication session; detecting an interrupt of the communication session at a frequency point associated with the RF signal; determining that the interrupt is caused by a failure of uplink data transmission in the communication session; and adjusting a position of the roadside unit to cause the communication session to be reestablished at the frequency point associated with the RF signal.

In an embodiment of the method, further comprising identifying a lobe zone associated with an antenna communicatively coupled to an RF generator that generates the RF signal; determining that the position of the roadside unit is within the lobe zone; and based on the determining of the position of the roadside unit, adjusting the position of the roadside unit to be located outside of the lobe zone.

In an embodiment of the method, further comprising configuring the roadside unit to operate at a power level that corresponds to a middle point within an operational range of transmit power associated with the roadside unit.

In an embodiment of the method, the uplink data transmission associated with the communication session corresponds to data transmission from the onboard unit to the roadside unit.

In an embodiment of the method, further comprising adjusting a frequency of the RF signal based on a predetermined operational pattern.

In an embodiment of the method, a range of the frequency is between 200 MHz and 6 GHz.

In an embodiment of the method, the RF signal is generated by an RF signal generator that is communicatively coupled to an antenna. The antenna is configured to be located in an enclosure that includes the onboard unit. The RF signal generator is configured to be located outside of the enclosure.

In an embodiment of the method, the antenna is a first antenna. The roadside unit is communicatively coupled to a second antenna. The antenna is configured to be located in the enclosure. The roadside unit is configured to be located outside of the enclosure.

In an embodiment of the method, the interrupt of the communication session comprises an occurrence of one or more communication errors or a connection failure of the communication session.

An embodiment provides a method comprising establishing a communication session between a first unit and a second unit; generating an RF signal to interfere with the communication session; detecting an interrupt of the communication session at a frequency point associated with the RF signal; determining that the interrupt is caused by a failure of uplink data transmission in the communication session; determining that the frequency point falls within a frequency range associated with the second unit; and adjusting a filter that is communicatively coupled between the second unit and an antenna associated with the second unit, the adjusting of the filter causing the communication session to be reestablished at the frequency point associated with the RF signal.

In an embodiment of the method, the filter is configured to partially or completely attenuate a strength of the RF signal at the frequency point.

In an embodiment of the method, the filter is a high-pass filter or a band-pass filter.

In an embodiment of the method, the first unit is an onboard unit. The second unit is a roadside unit.

In an embodiment of the method, further comprising identifying a local oscillator associated with the second unit; determining a frequency range of the local oscillator; and determining the frequency range based on a frequency range of the local oscillator and the frequency point associated with the RF signal.

An embodiment provides a system comprising an enclosure, configured to include a first unit; the first unit, configured to be communicatively coupled to a second unit; the second unit, configured to be located outside of the enclosure, the second unit comprises one or more high-pass filters; and a radio frequency signal generator, configured to generate a radio frequency signal to interfere with a communication session between the first unit and the second unit.

In an embodiment of the system, the first unit is an onboard unit. The second unit is a roadside unit.

In an embodiment of the system, the roadside unit can include a Dedicated Short-Range Communications (DSRC) transceiver. The roadside unit can be mounted along a road, or pedestrian passageway, for example.

In an embodiment of the system, the enclosure comprises a shielded room with absorbing material on internal reflective surfaces, the enclosure providing an isolated electromagnetic compatibility test facility that simulates open field testing.

In an embodiment of the system, the first unit and the second unit are communicatively coupled to a monitor that provides data associated with the communication session.

In an embodiment of the system, the first unit is communicatively coupled to a first antenna, wherein the second unit is communicatively coupled to a second antenna, wherein the first antenna and the second antenna are configured to be located in the enclosure. The first unit is configured to be located inside the enclosure. The second unit is configured to be located outside of the enclosure.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of examples, and not limitations, in the accompanying figures.

FIG. 2 is a flowchart illustrating an example method for electrical disturbance testing, according to various embodiments.

FIG. 3 is a flowchart illustrating an example method for electrical disturbance testing, according to various embodiments.

FIG. 4 is a flowchart illustrating an example method for electrical disturbance testing, according to various embodiments.

DETAILED DESCRIPTION

Figure 1:
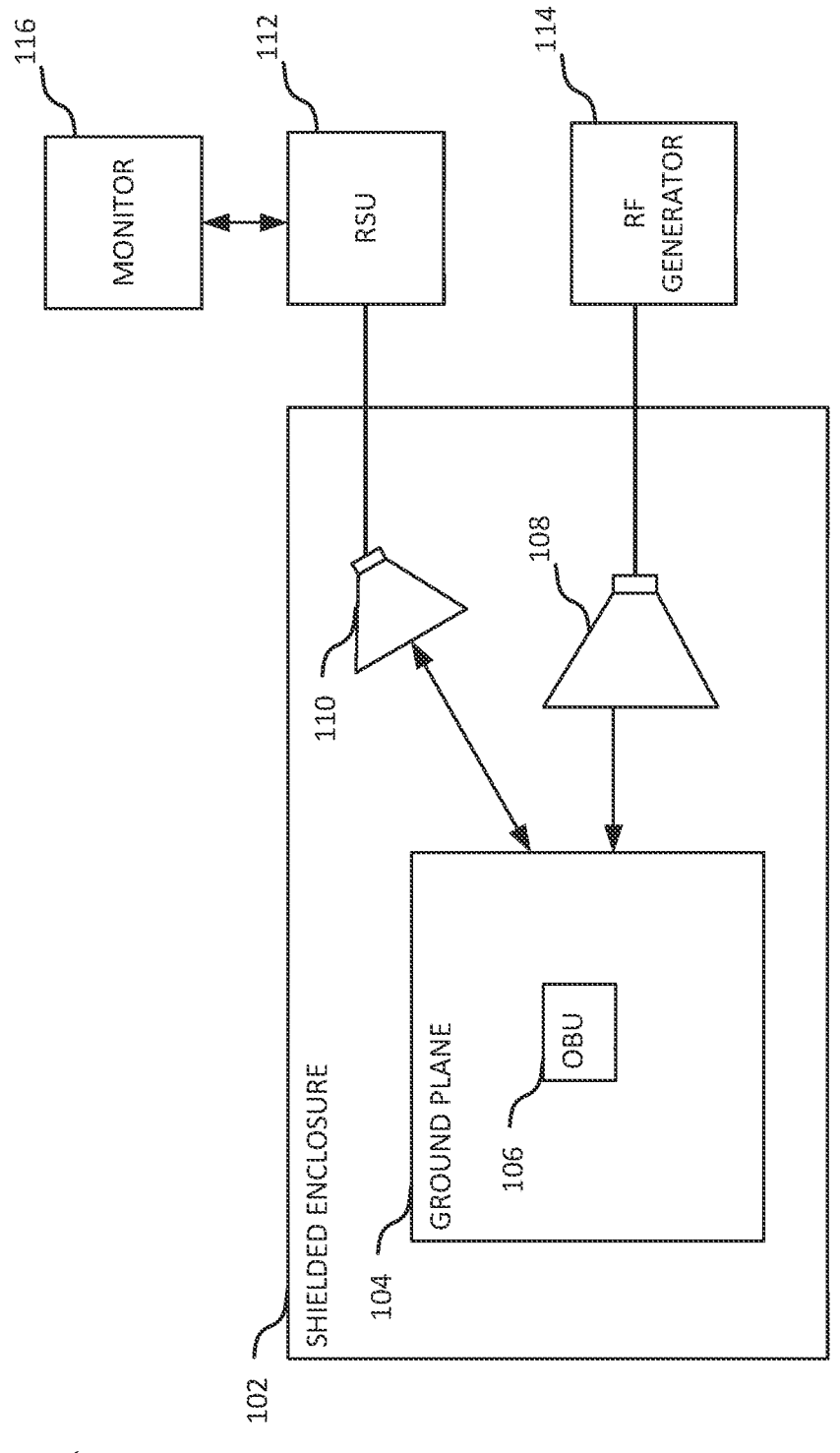
FIG. 1 is a block diagram showing an example system configured for electrical disturbance testing, according to various embodiments.

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter can be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described can be practiced without the specific details presented herein, or in various combinations, as described herein. Furthermore, well-known features can be omitted or simplified in order not to obscure the described embodiments. Various embodiments may be given throughout this description. These are merely descriptions of specific embodiments. The scope or meaning of the claims is not limited to the embodiments given.

Electronic toll collection requires communication between a vehicle and a toll station. Specifically, an onboard unit installed on a vehicle communicates with a roadside unit installed at the toll station to exchange data, including vehicle identification, location, travel distance, etc. Onboard units, especially pre-installed onboard units, are required to pass electrical disturbance testing in certain jurisdictions before being provided to vehicle manufacturers. Challenges arise during electrical disturbance testing of such onboard units, especially when it comes to determining and avoiding false positive errors that occurred during the testing.

Electrical disturbance testing, as described herein, tests the immunity of electronic components (e.g., onboard units) for vehicles. An electronic component under an electrical disturbance test is subjected to an electromagnetic disturbance generated inside an enclosure, such as an absorber-lined shielded enclosure. Devices configured to communicate with the electronic component and/or peripheral devices can be configured inside or outside the shielded enclosure. In various embodiments, the electrical disturbance testing method and system comply with ISO 11452-1 standard for general test conditions.

In various embodiments, electromagnetic electrical disturbances interference (or electromagnetic disturbances) can be any electromagnetic phenomenon that can degrade the performance of a device, an equipment, or a system. An electromagnetic interference (or an electromagnetic disturbance) can be an electromagnetic noise or a signal, such as a radio frequency signal.

Various examples include systems, methods, and non-transitory computer-readable media for data management that facilitate electrical disturbance testing and the identification and analysis of communication failures (or errors) that occurred during the test. In various embodiments, a system includes an enclosure, an onboard unit (e.g., the first unit), a roadside unit (e.g., the second unit), and a radio frequency signal generator. The enclosure can be an absorber-lined shielded enclosure that is configured to include the onboard unit ("OBU"). The OBU can be configured to be communicatively coupled to the roadside unit ("RSU"). The RSU can be configured to be located outside of the enclosure. The RSU can include one or more high-pass filters and/or band-pass filters.

The radio frequency signal generator can be configured to generate a radio frequency signal to interfere with the communication session between the OBU and the RSU. In various embodiments, the RSU can include a Dedicated Short-Range Communications (DSRC) transceiver. In various embodiments, the OBU and the RSU are communicatively coupled to a monitor that provides data associated with the communication session.

In various embodiments, the enclosure can be a shielded room with absorbing material on internal reflective surfaces. The enclosure is configured to provide an isolated electromagnetic compatibility test facility that simulates open-field testing.

In various embodiments, the RSU is communicatively coupled to an antenna (e.g., the first antenna). The radio frequency signal generator is communicatively coupled to another antenna (e.g., the second antenna). Both antennas are configured to be located in the enclosure. The RSU and the radio frequency signal generator are configured to be located outside of the enclosure, as illustrated in FIG. 1.

Reference will now be made in detail to embodiments, embodiments of which are illustrated in the appended drawings. The present disclosure may, however, be embodied in many different forms and should not be construed as being limited to the embodiments set forth herein.

FIG. 1 is a block diagram showing an example system 100 configured for electrical disturbance testing, according to various embodiments. As shown, system 100 includes a shielded enclosure 102, an RSU 112, a radio frequency (RF) generator 114, and a monitor 116. The shielded enclosure 102 includes a ground plane 104, an OBU 106, a first antenna 110, and a second antenna 108. The first antenna 110 is communicatively coupled to RSU. The second antenna 108 is communicatively coupled to the RF generator 114.

In various embodiments, the shielded enclosure 102 can be a shielded room with absorbing material on its internal reflective surfaces, optionally excluding the floor. The design objective is to attenuate the reflected energy in the test area by a certain level of decibels compared to the direct energy (e.g., a radio frequency signal).

In various embodiments, during operation, a radiation pattern of an antenna (e.g., antenna 108, antenna 110) shows a pattern of lobes at various angles. Antenna 108 and antenna 110 can be directional antennas in which the objective is to emit radio waves in one direction. A main lobe (or main lobe zone) has a higher field strength than the other lobes (or lobe zones). The other lobes can be referred to as side lobes (or side lobe zones), representing areas with unwanted radiation in undesired directions.

In various embodiments, ground plane 104 can be made of copper, brass, or steel at a certain size and degree of thickness. The ground plane 104 can be bonded to the shielded enclosure 102.

The OBU 106, or any device under the electrical disturbance test, can be placed on the ground plane 104. In various embodiments, the OBU 106 can be placed on a non-conductive, low-relative permittivity material above the ground plane 104.

The OBU 106 can be configured to communicate with the RSU 112 via the antenna 110 during the electrical disturbance test. The RSU 112 can be configured to be located outside of the shielded enclosure 102. The RSU 112 can include one or more high-pass filters and/or band-pass filters (not shown).

The radio frequency signal generator 114 can be configured to generate a radio frequency signal to interfere with the communication (or communication sessions) between the OBU 106 and the RSU 112. In various embodiments, the RSU 112 can include a Dedicated Short-Range Communications (DSRC) transceiver. In various embodiments, the OBU 106 and the RSU 112 are communicatively coupled to a monitor 116 that provides data associated with the communication sessions.

In various embodiments, the shielded enclosure 102 can be a shielded room with absorbing material (not shown) on internal reflective surfaces. The shielded enclosure 102 is configured to provide an isolated electromagnetic compatibility test facility that simulates open-field testing.

The RSU 112 is communicatively coupled to the antenna 110. The radio frequency signal generator 114 is communicatively coupled to the antenna 108. Both antennas 110 and 108 are configured to be located in the shielded enclosure 102. The RSU 112, the radio frequency signal generator 114, and the monitor 116 are configured to be located outside of the shielded enclosure 102, as illustrated in FIG. 1. Monitor 116 can be communicatively coupled to an antenna that is configured to be located inside the shielded enclosure, specifically, between the antenna (not shown) configured inside the OBU and the antenna 110 communicatively coupled to the RSU 112.

FIG. 2 is a flowchart illustrating an example method 200 for electrical disturbance testing, according to various embodiments. It will be understood that methods described herein may be performed by one or more machines in accordance with some embodiments. For example, method 200 can be performed by the system 100 described with respect to FIG. 1, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 200 may be represented by executable instructions that, when executed by a processor of a computing device, cause the computing device to perform method 200. Depending on the example, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 202, a system establishes a communication session between an OBU and an RSU.

In various embodiments, the system configures the RSU to operate at a power level that corresponds to a middle point within an operational range of transmit power associated with the RSU unit.

At operation 204, the system generates a radio frequency (RF) signal to interfere with the communication session for the purposes of electrical disturbance testing.

In various embodiments, during the electrical disturbance testing, the system adjusts the frequency of the RF signal based on a predetermined operational pattern. The range of the frequency of the RF signal can be between 200 MHz and 6 GHz.

At operation 206, the system detects an interrupt of the communication session at a frequency point associated with the RF signal. An interrupt of the communication session can include an occurrence of one or more communication errors or a connection failure of the communication session.

At operation 208, the system determines that the interrupt is caused by a failure of uplink data transmission in the communication session. The uplink data transmission associated with the communication session can correspond to data transmission from the OBU to the RSU. Conversely, a downlink data transmission associated with the communication session can correspond to data transmission from the RSU to the OBU.

In various embodiments, the system may determine that the interrupt is not caused by the device under test (e.g., the OBU) if a failure of uplink data transmission causes the interrupt. Specifically, the interrupt is likely caused by the RSU, such that the RSU failed to receive data from the OBU. Such failures (also referred to as false positive errors) are usually caused by the testing environment and/or devices (or components) other than the device under test.

In contrast, in various embodiments, if the system determines that an interrupt is caused by a downlink data transmission from the RSU to the OBU, then the system may determine that the issues are likely caused by the OBU such that the OBU, as the device under test, may have issues for the purposes of the electromagnetic compatibility determinations.

At operation 210, the system adjusts a position of the RSU (or causes the position of the RSU to be adjusted) to cause the communication session to be reestablished at the frequency point associated with the RF signal.

Though not illustrated, method 200 can include an operation where a graphical user interface for managing data can be displayed (or caused to be displayed) by a hardware processor. For instance, the operation can cause a computing device to display the graphical user interface for facilitating electrical disturbance testing. This operation for displaying the graphical user interface can be separate from operations 202 through 210 or, alternatively, form part of one or more of operations 202 through 210.

FIG. 3 is a flowchart illustrating an example method 300 for electrical disturbance testing, according to various embodiments. It will be understood that methods described herein may be performed by one or more machines in accordance with some embodiments. For example, method 300 can be performed by the system 100 described with respect to FIG. 1, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 300 may be represented by executable instructions that, when executed by a processor of a computing device, cause the computing device to perform method 300. Depending on the example, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 302, the system identifies (or causes to identify) a lobe zone, such as a main lobe zone or a side lobe zone described herein, associated with an antenna communicatively coupled to an RF generator that generates the RF signal.

At operation 304, the system determines (or causes to determine) that the position of the RSU is within the identified lobe zone.

At operation 306, the system, based on the determination of the position of the RSU, adjusts (or causes to adjust) the position of the RSU to be located outside of the identified lobe zone. In various embodiments, after the position of the RSU is adjusted, the system configures (or fine-tunes) the RSU to cause the communication session between the OBU and the RSU to be reestablished at the RF signal's frequency point associated with the interrupt.

Though not illustrated, method 300 can include an operation where a graphical user interface for managing data can be displayed (or caused to be displayed) by a hardware processor. For instance, the operation can cause a computing device to display the graphical user interface for facilitating electrical disturbance testing. This operation for displaying the graphical user interface can be separate from operations

302 through 306 or, alternatively, form part of one or more of operations 302 through 306.

FIG. 4 is a flowchart illustrating an example method 400 for electrical disturbance testing, according to various embodiments. It will be understood that methods described herein may be performed by one or more machines in accordance with some embodiments. For example, method 400 can be performed by the system 100 described with respect to FIG. 1, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform method 400. Depending on the example, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 402, a system establishes a communication session between an OBU and an RSU.

In various embodiments, the system configures the RSU to operate at a power level that corresponds to a middle point within an operational range of transmit power associated with the RSU unit.

At operation 404, the system generates a radio frequency (RF) signal to interfere with the communication session for the purposes of electrical disturbance testing.

In various embodiments, during the electrical disturbance testing, the system adjusts the frequency of the RF signal based on a predetermined operational pattern. The range of the frequency of the RF signal can be between 200 MHz and 6 GHz.

At operation 406, the system detects an interrupt of the communication session at a frequency point associated with the RF signal.

At operation 408, the system determines that the interrupt is caused by a failure of uplink data transmission in the communication session. The uplink data transmission associated with the communication session can correspond to data transmission from the OBU to the RSU. Conversely, a downlink data transmission associated with the communication session can correspond to data transmission from the RSU to the OBU.

In various embodiments, the system may determine that the interrupt is not caused by the device under test (e.g., the OBU) if a failure of uplink data transmission causes the interrupt. Specifically, the interrupt is likely caused by the RSU, such that the RSU failed to receive data from the OBU. Such failures (also referred to as false positive errors) are usually caused by the testing environment and/or devices (or components) other than the device under test.

In contrast, in various embodiments, if the system determines that an interrupt is caused by a downlink data transmission from the RSU to the OBU, then the system may determine that the issues are likely caused by the OBU such that the OBU, as the device under test, may have issues for the purposes of the electromagnetic compatibility determinations.

At operation 410, the system determines (or causes to determine) that the frequency point falls within an intermediate frequency range associated with the RSU.

In various embodiments, the system identifies a local oscillator associated with the RSU and determines an intermediate frequency range of the local oscillator. The intermediate frequency range can be determined based on the frequency range of the local oscillator and the RF signal's frequency point associated with the interrupt.

At operation 412, the system adjusts the filter that is communicatively coupled between the RSU and the antenna associated with the RSU. The adjusting of the filter can cause the communication session between the OBU and the RSU to be reestablished at the RF signal's frequency point associated with the interrupt.

In various embodiments, the filter is configured to partially or completely attenuate the strength of the RF signal at the frequency point associated with the interrupt. The filter can be a high-pass filter or a band-pass filter.

Though not illustrated, method 400 can include an operation where a graphical user interface for managing data can be displayed (or caused to be displayed) by a hardware processor. For instance, the operation can cause a computing device to display the graphical user interface for facilitating electrical disturbance testing. This operation for displaying the graphical user interface can be separate from operations 402 through 412 or, alternatively, form part of one or more of operations 402 through 412.

Figure 5:
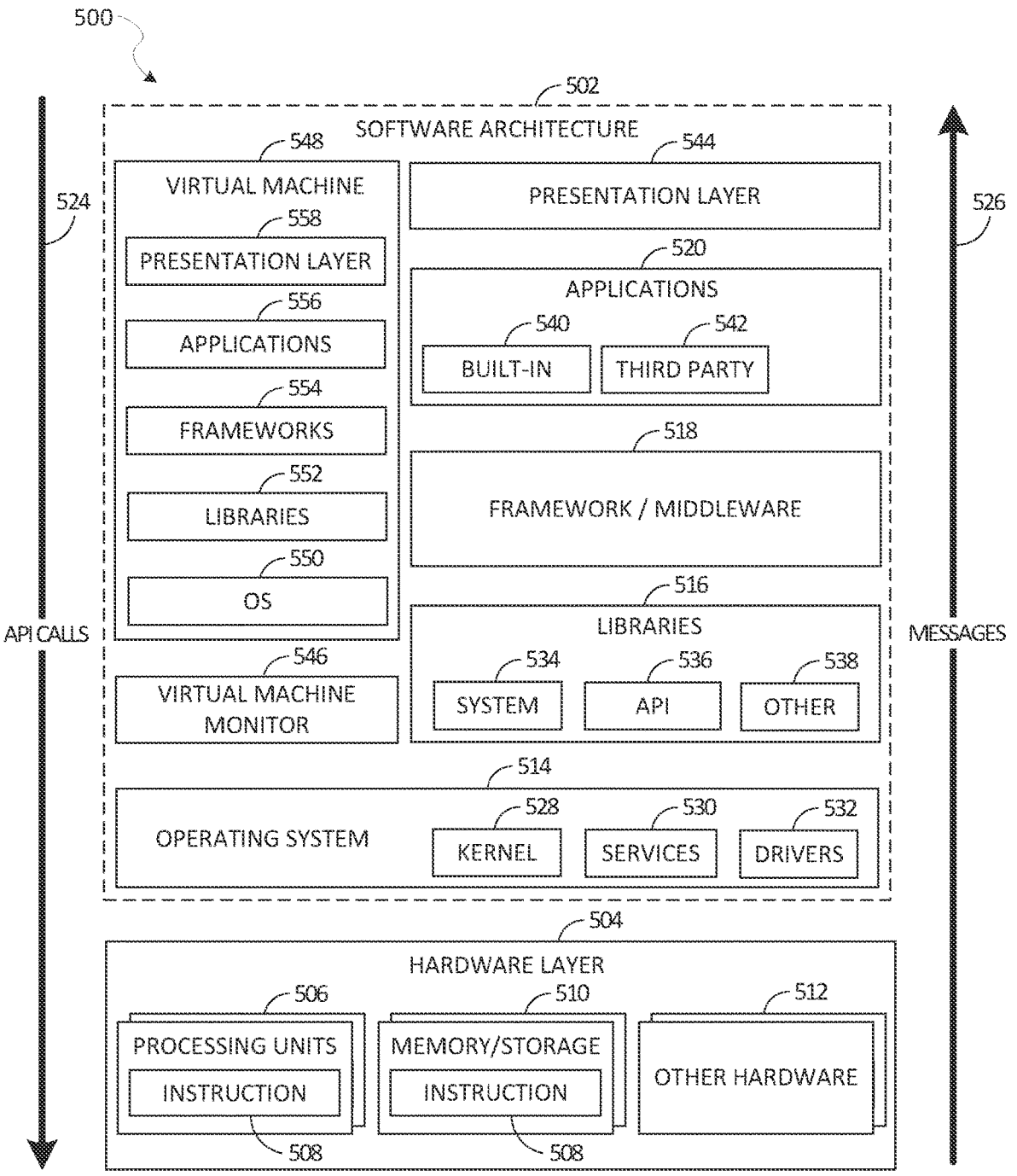
FIG. 5 is a block diagram illustrating a representative software architecture, which may be used in conjunction with various hardware architectures herein described, according to various embodiments.

FIG. 5 is a block diagram illustrating an example of a software architecture 502 that may be installed on a machine, according to some embodiments. FIG. 5 is merely a non-limiting example of a software architecture, and it will be appreciated that many other architectures may be implemented to facilitate the functionality described herein. The software architecture 502 may be executing on hardware such as a machine 600 of FIG. 6 that includes, among other things, processors 610, memory 630, and input/output (I/O)) components 650. A representative hardware layer 504 is illustrated and can represent, for example, the machine 600 of FIG. 6. The representative hardware layer 504 comprises one or more processing units 506 having associated executable instructions 508. The executable instructions 508 represent the executable instructions of the software architecture 502. The hardware layer 504 also includes memory or storage modules 510, which also have the executable instructions 508. The hardware layer 504 may also comprise other hardware 512, which represents any other hardware of the hardware layer 504, such as the other hardware illustrated as part of the machine 600.

In the example architecture of FIG. 5, the software architecture 502 may be conceptualized as a stack of layers, where each layer provides particular functionality. For example, the software architecture 502 may include layers such as an operating system 514, libraries 516, frameworks/middleware 518, applications 520, and a presentation layer 544. Operationally, the applications 520 or other components within the layers may invoke API calls 524 through the software stack and receive a response, returned values, and so forth (illustrated as messages 526) in response to the API calls 524. The layers illustrated are representative in nature, and not all software architectures have all layers. For example, some mobile or special-purpose operating systems may not provide a frameworks/middleware 518 layer, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 516 may provide a common infrastructure that may be utilized by the applications 520 and/or other components and/or layers. The libraries 516 typically provide functionality that allows other software modules to perform tasks in an easier fashion than by interfacing directly with the underlying operating system 514 functionality (e.g., kernel 528, services 530, or drivers 532). The libraries 516 may include system libraries 534 (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 518 (also sometimes referred to as middleware) may provide a higher-level common infrastructure that may be utilized by the applications 520 or other software components/modules. For example, the frameworks 518 may provide various graphical user interface functions, high-level resource management, high-level location services, and so forth. The frameworks 518 may provide a broad spectrum of other APIs that may be utilized by the applications 520 and/or other software components/modules, some of which may be specific to a particular operating system or platform.

The applications 520 include built-in applications 540 and/or third-party applications 542. Examples of representative built-in applications 540 may include, but are not limited to, a home application, a contacts application, a browser application, a book reader application, a location application, a media application, a messaging application, or a game application.

The third-party applications 542 may include any of the built-in applications 540, as well as a broad assortment of other applications. In a specific example, the third-party applications 542 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 542 may invoke the API calls 524 provided by the mobile operating system such as the operating system 514 to facilitate functionality described herein.

The applications 520 may utilize built-in operating system functions (e.g., kernel 528, services 530, or drivers 532), libraries (e.g., system libraries 534, API libraries 536, and other libraries 538), or frameworks/middleware 518 to create user interfaces to interact with users of the system. Alternatively, or additionally, in some systems, interactions with a user may occur through a presentation layer, such as the presentation layer 544. In these systems, the application/module "logic" can be separated from the aspects of the application/module that interact with the user.

Some software architectures utilize virtual machines. In the example of FIG. 5, this is illustrated by a virtual machine 548. The virtual machine 548 creates a software environment where applications/modules can execute as if they were executing on a hardware machine (e.g., the machine 600 of FIG. 6). The virtual machine 548 is hosted by a host operating system (e.g., the operating system 514) and typically, although not always, has a virtual machine monitor 546, which manages the operation of the virtual machine 548 as well as the interface with the host operating system (e.g., the operating system 514). A software architecture executes within the virtual machine 548, such as an operating system 550, libraries 552, frameworks/middleware 554, applications 556, or a presentation layer 558. These layers of software architecture executing within the virtual machine 548 can be the same as corresponding layers previously described or may be different.

Figure 6:
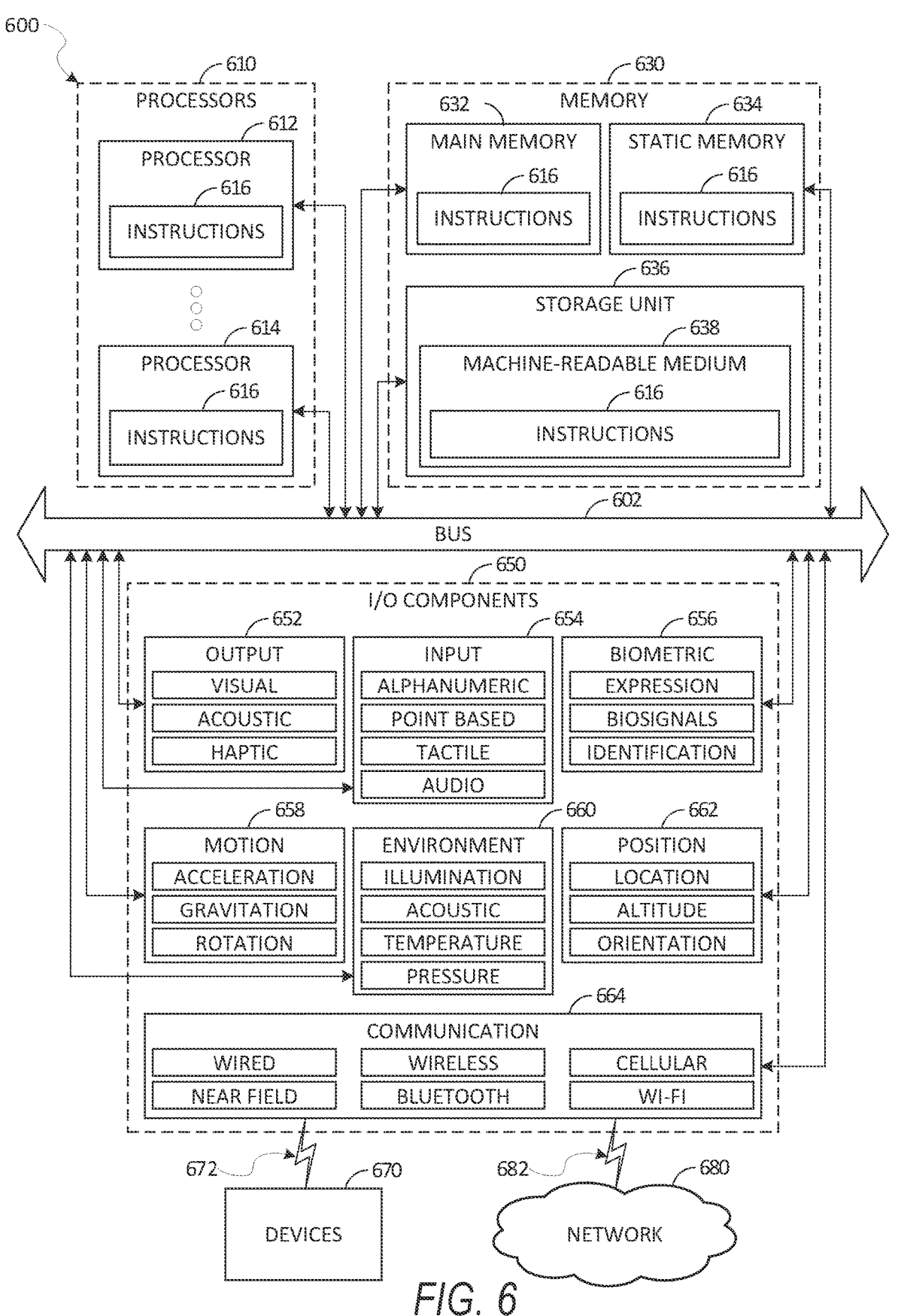
FIG. 6 is a block diagram illustrating components of a machine able to read instructions from a machine storage medium and perform any one or more of the methodologies discussed herein according to various embodiments.

FIG. 6 illustrates a diagrammatic representation of a machine 600 in the form of a computer system within which a set of instructions may be executed for causing the machine 600 to perform any one or more of the methodologies discussed herein, according to an example. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600, or one or more machines 600, to execute the method 200 described above with respect to FIG. 2, the method 300 described above with respect to FIG. 3, and the method 400 described above with respect to FIG. 4. The instructions 616 transform the general, non-programmed machine 600 into a particular machine 600 programmed to carry out the described and illustrated functions in the manner described. In some embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example, the processors 610 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions contemporaneously. Although FIG. 6 shows multiple processors 610, the machine 600 may include a single processor with a single core, a single processor with multiple cores (e.g., a multi-core processor), multiple processors with a single core, multiple processors with multiples cores, or any combination thereof.

The memory 630 may include a main memory 632, a static memory 634, and a storage unit 636 including machine-readable medium 638, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 650 may include biometric components 656, motion components 658, environmental components 660, or position components 662, among a wide array of other components. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a USB).

Moreover, the communication components 664 may detect identifiers or include components operable to detect identifiers. For example, the communication components 664 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

Certain examples are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In various embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In examples in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 600 including processors 610), with these operations being accessible via a network (e.g., the Internet) and via one or more appropriate interfaces (e.g., an API). In certain examples, a client device may relay or operate in communication with cloud computing systems, and may access circuit design information in a cloud environment.

The performance of certain of the operations may be distributed among the processors, not only residing within a single machine 600, but deployed across a number of machines 600. In some examples, the processors 610 or processor-implemented modules are located in a single geographic location (e.g., within a home environment, an office environment, or a server farm). In other examples, the processors or processor-implemented modules are distributed across a number of geographic locations.

Executable Instructions and Machine Storage Medium

The various memories (i.e., 630, 632, 634, and/or the memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed examples.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 616 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 680 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an example described herein can be implemented using a non-transitory medium (e.g., a non-transitory computer-readable medium).

EXAMPLES

The following examples describe various embodiments of methods, machine-readable media, and systems (e.g., machines, devices, or other apparatus) discussed herein.

1. A method comprising:
establishing a communication session between an onboard unit and a roadside unit; generating a radio frequency (RF) signal to interfere with the communication session;
detecting an interrupt of the communication session at a frequency point associated with the RF signal;
determining that the interrupt is caused by a failure of uplink data transmission in the communication session; and
adjusting a position of the roadside unit to cause the communication session to be reestablished at the frequency point associated with the RF signal.

2. The method of example 1, further comprising:
identifying a lobe zone associated with an antenna communicatively coupled to an RF generator that generates the RF signal;
determining that the position of the roadside unit is within the lobe zone; and
sbased on the determining of the position of the roadside unit, adjusting the position of the roadside unit to be located outside of the lobe zone.

3. The method of any of the preceding examples, further comprising:
configuring the roadside unit to operate at a power level that corresponds to a middle point within an operational range of transmit power associated with the roadside unit.

4. The method of any of the preceding examples, wherein the uplink data transmission associated with the communication session corresponds to data transmission from the onboard unit to the roadside unit.

5. The method of any of the preceding examples, further comprising:
adjusting a frequency of the RF signal based on a predetermined operational pattern.

6. The method of any of the preceding examples, wherein a range of the frequency is between 200 MHz and 6 GHz.

7. The method of any of the preceding examples, wherein the RF signal is generated by an RF signal generator that is communicatively coupled to an antenna, the antenna being configured to be located in an enclosure that includes the onboard unit, the RF signal generator being configured to be located outside of the enclosure.

8. The method of any of the preceding examples, wherein the antenna is a first antenna, and wherein the roadside unit is communicatively coupled to a second antenna, the antenna being configured to be located in the enclosure, the roadside unit being configured to be located outside of the enclosure.

9. The method of claim 1, wherein the interrupt of the communication session comprises an occurrence of one or more communication errors or a connection failure of the communication session, and wherein the onboard unit comprises an antenna configured inside the onboard unit.

10. A method comprising:
establishing a communication session between a first unit and a second unit;
generating an RF signal to interfere with the communication session;

detecting an interrupt of the communication session at a frequency point associated with the RF signal;
determining that the interrupt is caused by a failure of uplink data transmission in the communication session;
determining that the frequency point falls within a frequency range associated with the second unit; and
adjusting a filter that is communicatively coupled between the second unit and an antenna associated with the second unit, the adjusting of the filter causing the communication session to be reestablished at the frequency point associated with the RF signal.

11. The method of example 10, wherein the filter is configured to partially or completely attenuate a strength of the RF signal at the frequency point.

12. The method of any of the preceding examples, wherein the filter is a high-pass filter or a band-pass filter.

13. The method of any of the preceding examples, wherein the first unit is an onboard unit, and wherein the second unit is a roadside unit.

14. The method of any of the preceding examples, further comprising:
identifying a local oscillator associated with the second unit;
determining a frequency range of the local oscillator; and
determining the frequency range based on a frequency range of the local oscillator and the frequency point associated with the RF signal.

15. A system comprising:
an enclosure, configured to include a first unit;
the first unit, configured to be communicatively coupled to a second unit;
the second unit, configured to be located outside of the enclosure, the second unit comprises one or more high-pass filters; and
a radio frequency signal generator, configured to generate a radio frequency signal to interfere with a communication session between the first unit and the second unit.

16. The system of example 15, wherein the first unit is an onboard unit, and wherein the second unit is a roadside unit.

17. The system of any of the preceding examples 16, wherein the roadside unit is a Dedicated Short-Range Communications (DSRC) transceiver.

18. The system of any of the preceding examples, wherein the enclosure comprises a shielded room with absorbing material on internal reflective surfaces, the enclosure providing an isolated electromagnetic compatibility test facility that simulates open field testing.

19. The system of any of the preceding examples, wherein the first unit and the second unit are communicatively coupled to a monitor that provides data associated with the communication session.

20. The system of any of the preceding examples, wherein the first unit is communicatively coupled to a first antenna, wherein the second unit is communicatively coupled to a second antenna, wherein the first antenna and the second antenna are configured to be located in the enclosure, wherein the first unit is configured to be located inside the enclosure, wherein the second unit is configured to be located outside of the enclosure, wherein the first unit comprises a third antenna configured inside the first unit, and wherein the monitor is communicatively coupled to a fourth antenna configured to be located inside the enclosure between the second antenna and the third antenna.

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments. The specification and drawings are, accordingly, to be regarded in an illustrative rather than a restrictive sense.

It will be understood that changes and modifications may be made to the disclosed examples without departing from the scope of the present disclosure. These and other changes or modifications are intended to be included within the scope of the present disclosure.

What is claimed is:

1. A method comprising:
establishing a communication session between an onboard unit and a roadside unit;
generating a radio frequency (RF) signal to interfere with the communication session;
detecting an interrupt of the communication session at a frequency point associated with the RF signal;
determining that the interrupt is caused by a failure of uplink data transmission in the communication session; and
adjusting a position of the roadside unit to cause the communication session to be reestablished at the frequency point associated with the RF signal.

2. The method of claim 1, further comprising:
identifying a lobe zone associated with an antenna communicatively coupled to an RF generator that generates the RF signal;
determining that the position of the roadside unit is within the lobe zone; and
based on the determining of the position of the roadside unit, adjusting the position of the roadside unit to be located outside of the lobe zone.

3. The method of claim 1, further comprising:
configuring the roadside unit to operate at a power level that corresponds to a middle point within an operational range of transmit power associated with the roadside unit.

4. The method of claim 1, wherein the uplink data transmission associated with the communication session corresponds to data transmission from the onboard unit to the roadside unit.

5. The method of claim 1, further comprising:
adjusting a frequency of the RF signal based on a predetermined operational pattern.

6. The method of claim 5, wherein a range of the frequency is between 200 MHz and 6 GHz.

7. The method of claim 1, wherein the RF signal is generated by an RF signal generator that is communicatively coupled to an antenna, the antenna being configured to be located in an enclosure that includes the onboard unit, the RF signal generator being configured to be located outside of the enclosure.

8. The method of claim 7, wherein the antenna is a first antenna, and wherein the roadside unit is communicatively coupled to a second antenna, the antenna being configured to be located in the enclosure, the roadside unit being configured to be located outside of the enclosure.

9. The method of claim 1, wherein the interrupt of the communication session comprises an occurrence of one or more communication errors or a connection failure of the communication session, and wherein the onboard unit comprises an antenna configured inside the onboard unit.

10. A system comprising:
an enclosure, configured to include a first unit;
the first unit, configured to be communicatively coupled to a second unit, wherein the first unit and the second unit are communicatively coupled to a monitor that provides data associated with the communication session, wherein the first unit is communicatively coupled to a first antenna, wherein the second unit is communicatively coupled to a second antenna, wherein the first antenna and the second antenna are configured to be located in the enclosure, wherein the first unit is configured to be located inside the enclosure, wherein the second unit is configured to be located outside of the enclosure, wherein the first unit comprises a third antenna configured inside the first unit, and wherein the monitor is communicatively coupled to a fourth antenna configured to be located inside the enclosure between the second antenna and the third antenna;
the second unit, configured to be located outside of the enclosure, the second unit comprises one or more high-pass filters; and
a radio frequency signal generator, configured to generate a radio frequency signal to interfere with a communication session between the first unit and the second unit.

11. The system of claim 10, wherein the first unit is an onboard unit, and wherein the second unit is a roadside unit.

12. The system of claim 11, wherein the roadside unit is a Dedicated Short-Range Communications (DSRC) transceiver.

13. The system of claim 10, wherein the enclosure comprises a shielded room with absorbing material on internal reflective surfaces, the enclosure providing an isolated electromagnetic compatibility test facility that simulates open field testing.

* * * * *